(12) United States Patent
Hansen

(10) Patent No.: US 6,851,828 B1
(45) Date of Patent: Feb. 8, 2005

(54) FLASHLIGHT UTILIZING DIFFERENTLY SIZED BATTERIES

(76) Inventor: William J. Hansen, W283 N3871 Yorkshire Ter., Pewaukee, WI (US) 53072

(*) Notice: Subject to any disclaimer, the term of this patent is extended or adjusted under 35 U.S.C. 154(b) by 0 days.

(21) Appl. No.: 10/619,902

(22) Filed: Jul. 15, 2003

(51) Int. Cl.[7] .............................. F21L 4/00; H01M 2/10
(52) U.S. Cl. ......................... 362/203; 362/206; 429/99
(58) Field of Search ............................ 362/202–203, 362/206, 194, 195, 208; 439/500; 429/99, 98, 96

(56) References Cited

U.S. PATENT DOCUMENTS

| | | | |
|---|---|---|---|
| 3,510,644 A | | 5/1970 | Braese ........................ 362/202 |
| 3,969,148 A | | 7/1976 | Trattner ...................... 429/100 |
| 3,990,919 A | | 11/1976 | Krueger ............... 425/174.8 R |
| 4,020,245 A | | 4/1977 | Mabuchi et al. ............ 429/100 |
| 4,057,677 A | | 11/1977 | Mabuchi ..................... 429/100 |
| 4,397,920 A | | 8/1983 | Trattner ...................... 429/100 |
| 4,607,207 A | * | 8/1986 | Bruneau ...................... 429/99 |
| 4,767,358 A | | 8/1988 | Nullmeyer et al. ......... 439/500 |
| 5,006,969 A | | 4/1991 | Lai ............................. 362/206 |
| 5,167,447 A | | 12/1992 | Gonzales .................... 362/202 |
| 5,239,451 A | * | 8/1993 | Menke et al. ............... 362/199 |
| 5,264,303 A | * | 11/1993 | McCaffery ................... 429/99 |
| 5,353,208 A | | 10/1994 | Moore ......................... 362/202 |
| 5,357,411 A | | 10/1994 | Menke et al. ............... 362/183 |
| 5,686,811 A | * | 11/1997 | Bushong et al. ............ 320/110 |
| 5,733,674 A | | 3/1998 | Law et al. ...................... 429/9 |
| 5,954,420 A | | 9/1999 | Smith ......................... 362/198 |
| 6,039,456 A | * | 3/2000 | Chabria ...................... 362/189 |
| 6,074,778 A | | 6/2000 | Stagakis ....................... 429/99 |
| 6,454,434 B1 | * | 9/2002 | Hee ............................ 362/194 |

* cited by examiner

Primary Examiner—Alan Cariaso
Assistant Examiner—Ali Alavi
(74) Attorney, Agent, or Firm—Andrus, Sceales, Starke & Sawall, LLP

(57) ABSTRACT

A flashlight is provided for differently sized batteries, each having a different length, a different cross sectional area, a positive pole and a negative pole. The flashlight includes an elongated body having a plurality of differently spaced and differently sized longitudinal grooves. Each groove is configured to retain one of the differently sized batteries so that the batteries lie parallel to each other with the negative poles of the batteries being coplanar and the positive poles of the batteries being variously located in different planes axially in the body. An end cap is screwthreadedly attached to a rear portion of the body. The end cap is formed with a contact ring selectively engageable and disengageable with the coplanar negative poles of the batteries. A reflector head is screwthreadedly attached to a forward portion of the body for holding a lamp therein. A multi-planar contact is interposed between the positive poles of the batteries and the reflector head, and engaged against the lamp. The multi-planar contact has a number of faces disposed at the different planes for constantly engaging the positive poles of the batteries.

17 Claims, 8 Drawing Sheets

FLASHLIGHT UTILIZING DIFFERENTLY SIZED BATTERIES

FIELD OF THE INVENTION

The present invention relates broadly to flashlights, and more particularly, pertains to flashlights which conveniently accommodate differently sized batteries.

BACKGROUND OF THE INVENTION

It is of course well known that flashlights are powered by batteries with one or more of such batteries being utilized for causing the bulb of the flashlight to be energized when the switch of the flashlight is operated. Flashlights are designed to accommodate different numbers of batteries, with compact flashlights using at least one battery and other flashlights using multiple batteries depending on their size and desired power for illumination intensity. It is also well known that these batteries are produced in different sizes among which the AA, AAA, C and D sizes are widely utilized in flashlights as these batteries have similar electrical discharge and charging capabilities. It frequently occurs that when at least one battery of a size noted above needs replacement, there is only available other sized batteries but ones that are electrically acceptable.

Flashlights which operate using differently sized batteries are disclosed in U.S. Pat. Nos. 5,006,969; 5,167,447; 5,357,411 and 5,954,420. In addition, it is known to use an adapter for receiving differently sized batteries as set forth in U.S. Pat. Nos. 3,969,148; 3,990,919; 4,020,245; 4,057,677; and 4,767,358. The majority of these patents disclose the use of differently sized batteries stacked in end-to-end relationship so that the batteries are arranged electrically in series relationship.

It is further known to provide a flashlight which holds multiple batteries that are physically arranged in parallel (i.e. side-by-side) and electrically arranged in series so as to provide a compact and versatile design. One such flashlight is shown in U.S. Pat. No. 5,353,208 wherein a flashlight barrel is formed with equally spaced, longitudinal grooves for holding a plurality of identically sized batteries. The problem with this design is that should one battery be used up or defective, the flashlight is rendered inoperative until a replacement battery of the same size can be obtained.

Given the prior art, it is desirable to provide a relatively compact, simple flashlight for accommodating differently sized batteries in a physically parallel configuration without the need for an adapter. Such a flashlight should be operable using a single battery of the AA, AAA, C or D size as well as various combinations thereof.

SUMMARY OF THE INVENTION

It is a general object of the present invention to provide a flashlight for holding a plurality of batteries having varying lengths and cross sectional dimensions in a side-by-side array such that longitudinal axes of the batteries are parallel with each other.

In one aspect of the invention, a flashlight is provided for differently sized batteries, each having a different length, a different cross sectional area, a positive pole and a negative pole. The flashlight includes a single elongated body having a plurality of differently sized retaining structures for holding differently sized batteries in side-by-side relationship. Each retaining structure is formed to receive only one size of at least one battery. An end cap is attached to one end of the body and is provided with a first contact therein commonly engageable with the negative poles of the batteries. A reflector head is attached to the opposite end of the body and holds a lamp. A second contact is commonly and directly engaged against the positive poles of the batteries, the reflector head and the lamp. The flashlight is constructed and arranged to connect the batteries electrically in parallel with one another. The body holds the batteries such that the negative poles are coplanar in the body, and the positive poles are variously located axially in the body. The second contact includes a plurality of faces for engaging the positive poles variously located axially in the body. The body is preferably formed with a uniform length.

In another aspect of the invention, a flashlight is provided for differently sized batteries, each having a different length, a different cross sectional area, a positive pole and a negative pole. The flashlight includes an elongated body having a plurality of differently spaced and differently sized, longitudinal grooves. Each groove is configured to retain one of the differently sized batteries so that the batteries lie parallel to each other with the negative poles of the batteries being coplanar, and the positive poles of the batteries being variously located in different planes axially in the body. An end cap is screw threadedly attached to a rear portion of the body. The end cap is formed with a contact ring selectively engageable and disengageable with the coplanar negative poles of the batteries. A reflector head is screw threadedly attached to a forward portion of the body for holding a lamp therein. A multi-planar contact is interposed between the positive poles of the batteries and the reflector head, and is engaged against the lamp. The multi-planar contact has a number of faces disposed in the different planes for constantly engaging the positive poles of the batteries.

Rotation of the end cap acts as a switch for selectively placing the lamp in electrical communication with the batteries. The body, the end cap with the contact ring, the reflector head, the multi-planar contact and the batteries define an electrical circuit connecting the batteries electrically in parallel with one another. The body contains at least one battery. The battery is selected from the group consisting of AAA, C, D and AA size batteries. In one embodiment, the battery has a circular cross sectional area. The body has four differently spaced grooves with different curvatures for holding cylindrically shaped, differently sized batteries. In one embodiment, the body contains at least two batteries of the same size in end-to-end relationship. The multi-planar contact compensates for the varying length of the differently sized batteries. The body, the end cap with the contact ring, the reflector head, and the multi-planar contact are all constructed of an electrically conductive metallic material. A first groove is capable of holding at least one AAA size battery, a second groove is capable of holding at least one AA size battery, a third groove is capable of holding at least one C sized battery and a fourth groove is capable of holding at least one D sized battery.

In yet another aspect of the invention, a flashlight has a body for holding differently sized batteries, each having a different length, a different cross sectional area, a positive pole and a negative pole. An end cap is attached to one end of the body, and a reflector head with a lamp is attached to an opposite end of the body. A contact structure is engaged with the positive and negative poles of the battery. The invention is improved wherein the body is a single unit provided with a plurality of differently spaced and differently sized retaining structures for holding the differently sized batteries in parallel relationship within the same body. Each retaining structure is formed to receive only one size of battery. The contact structure includes a rigid, multi-planar contact for compensating for the varying lengths of the differently sized batteries within the same body.

Various other objects, features and advantages of the invention will be made apparent from the following description taken together with the drawings.

BRIEF DESCRIPTION OF THE SEVERAL VIEWS OF THE DRAWINGS

The drawings illustrate the best mode presently contemplated of carrying out the invention.

In the drawings:

FIG. 8 is an enlarged perspective view of the multi-planar contact used in the flashlight;

DETAILED DESCRIPTION OF THE INVENTION

Figure 1:
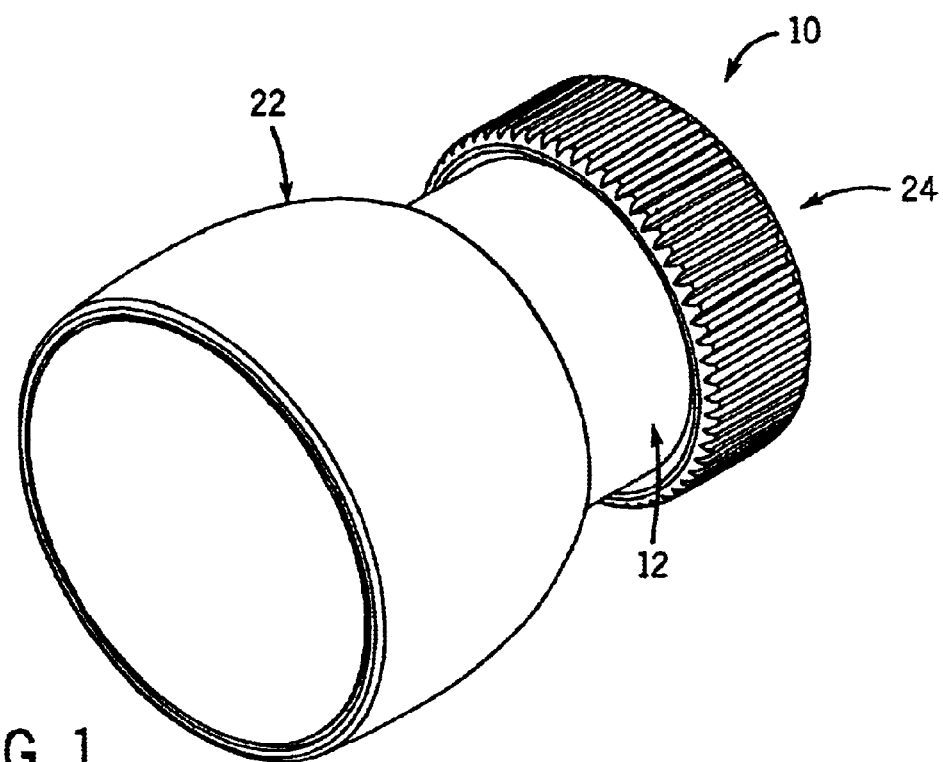
FIG. 1 is a front perspective view of a flashlight embodying the present invention.
Figure 2:
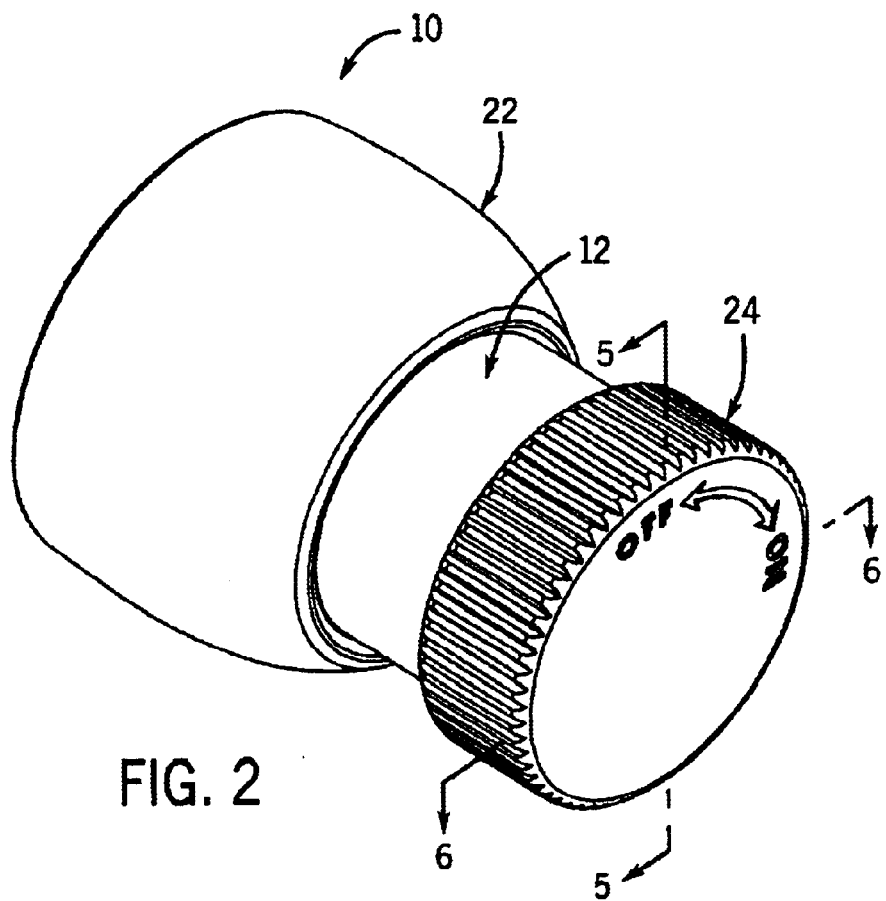
FIG. 2 is a rear perspective view of the flashlight in FIG. 1.
Figure 3:
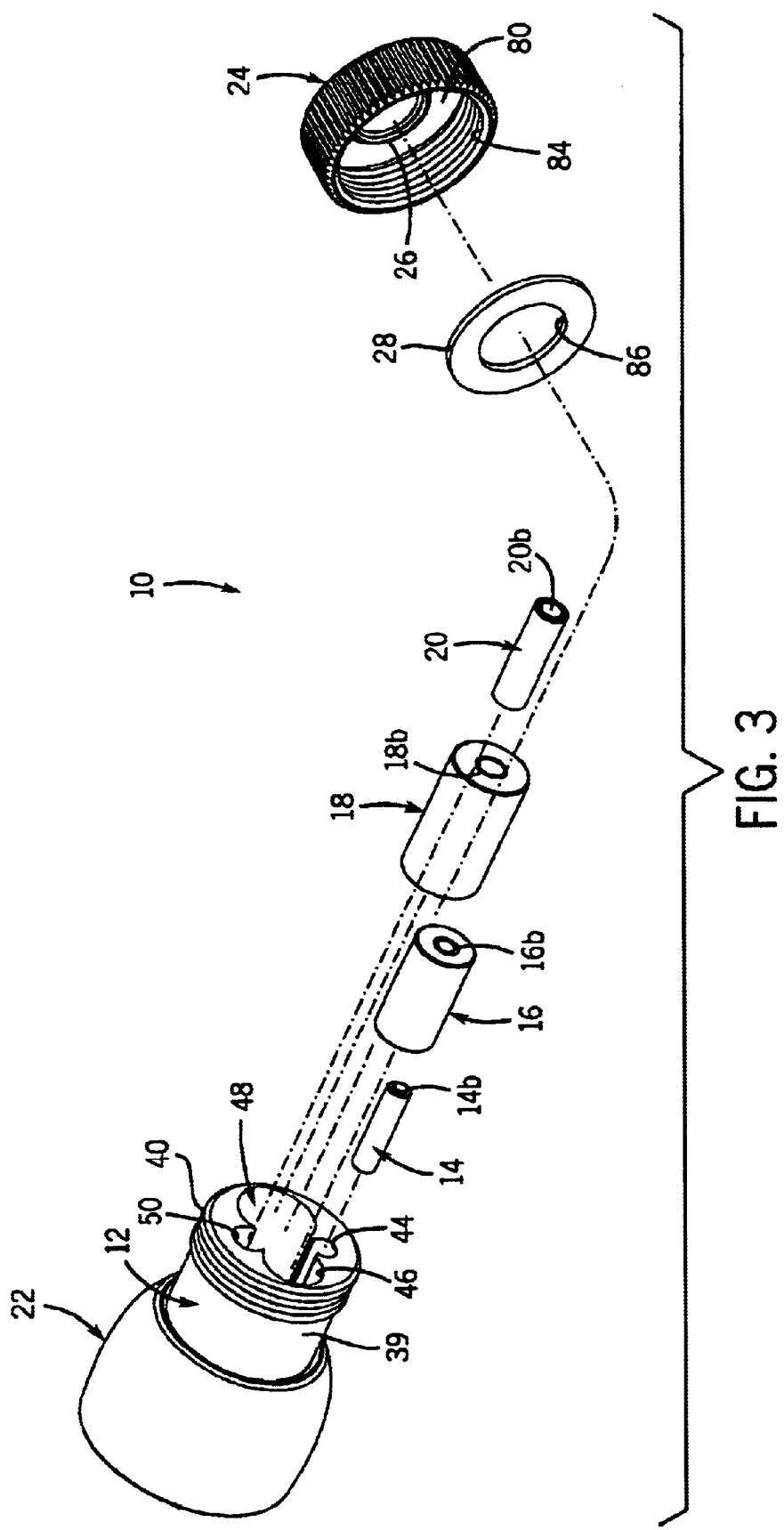
FIG. 3 is a partially exploded view of the flashlight in FIG. 2.
Figure 4:
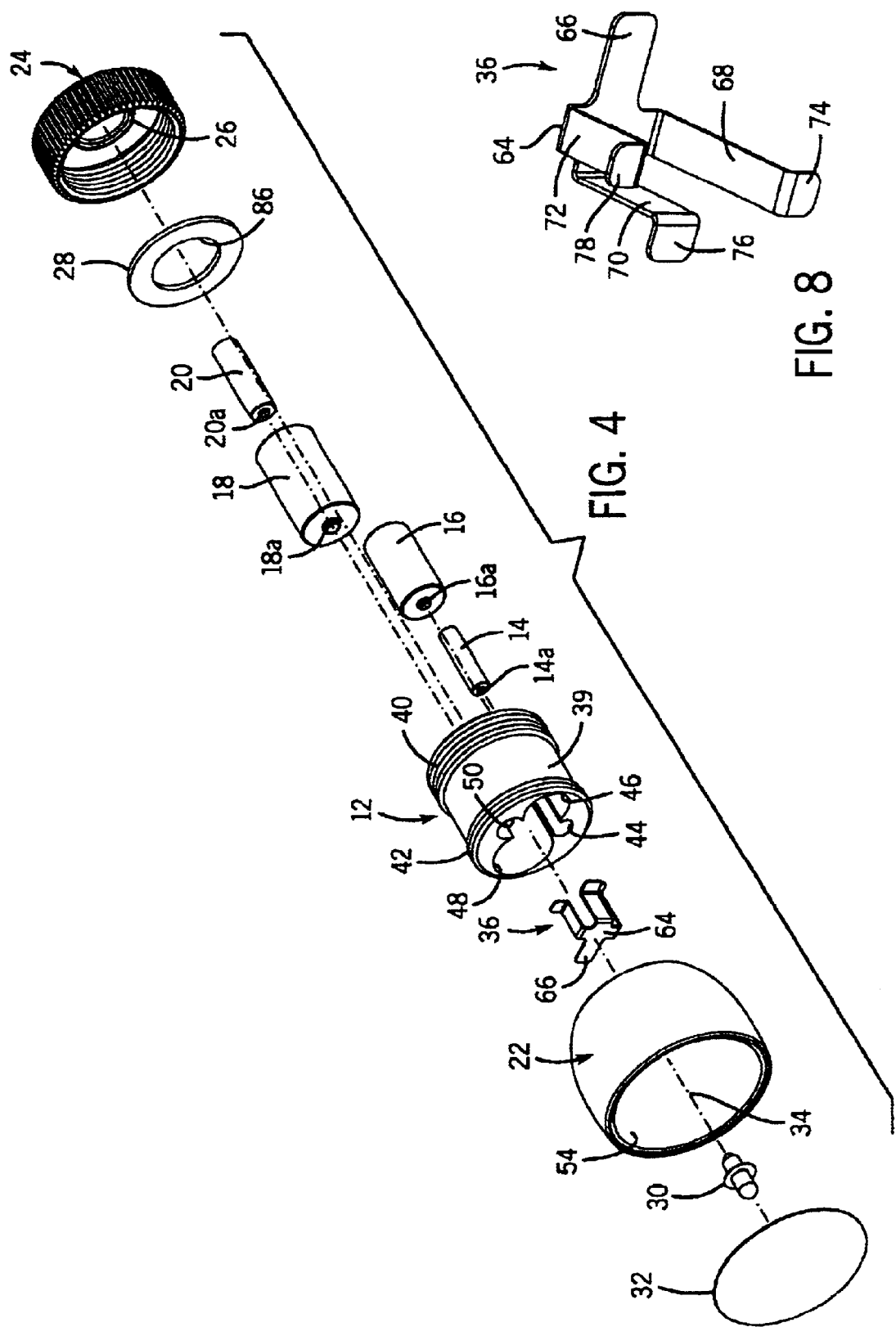
FIG. 4 is a fully exploded view of the flashlight in FIG. 1.

Referring now to the drawings and, in particular FIGS. 1 through 4, thereshown is a compact flashlight 10 constructed in accordance with the present invention. Flashlight 10 includes an elongated body 12 containing a plurality of differently sized batteries 14, 16, 18, 20, a reflector head 22 removably attached to a forward portion of the body, and an end cap 24 removably attached to a rear portion of the body 12. End cap 24 is provided with an inwardly protruding contact ring 26, and is designed to hold a compressable washer 28. Reflector head 22 contains a lamp 30 and a lens 32 through which light is emitted in a beam parallel to a longitudinal axis 34 of the flashlight 10. A rigid, multi-planar contact 36 is interposed between the body 12 and the reflector head 22. End cap 24 functions as an on/off switch 38 in a manner to be described hereafter. Contact ring 26 and multi-planar contact 36 define electrical contact means at the respective back and front ends of the batteries 14, 16, 18, 20.

Figure 5:
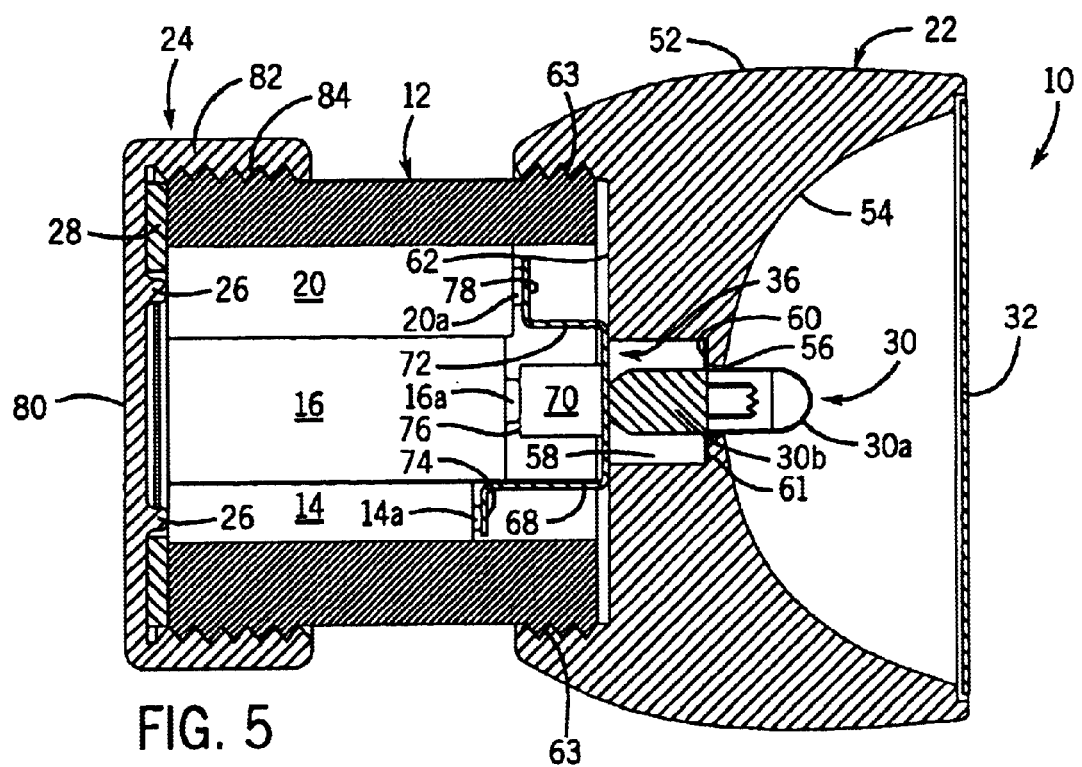
FIG. 5 is a sectional view taken on line 5—5 of FIG. 2, showing the flashlight in an on condition.
Figure 6:
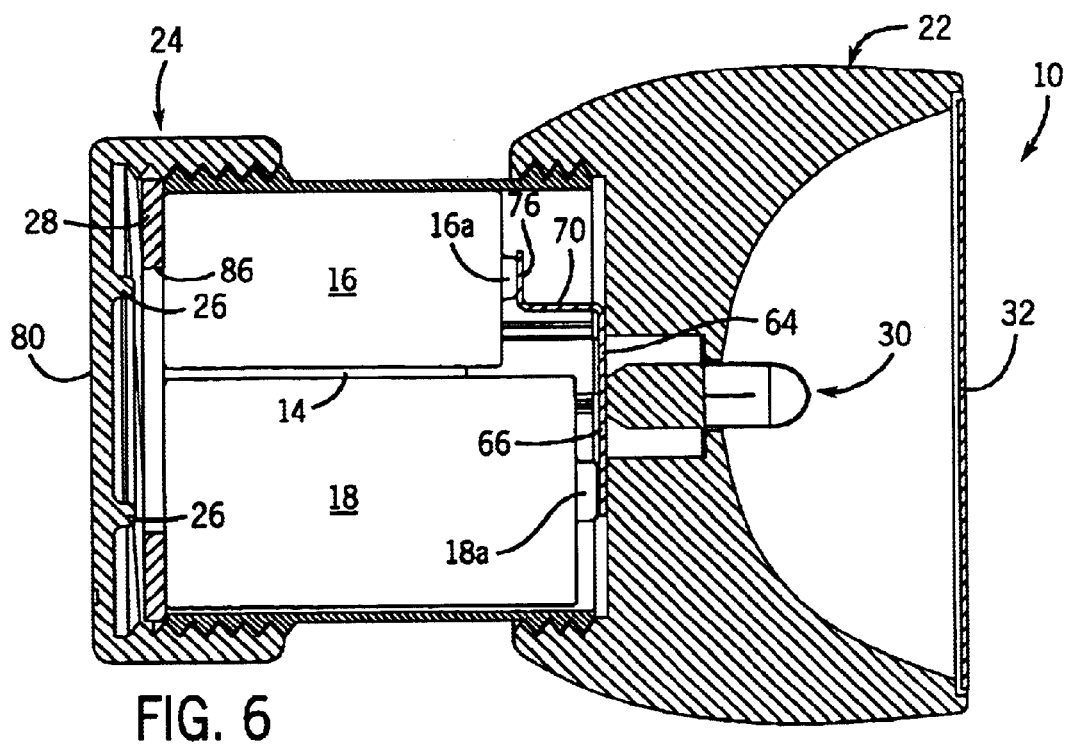
FIG. 6 is a sectional view taken on line 6—6 of FIG. 2, showing the flashlight in an off condition.

As seen in FIGS. 3, 4, 12, 13 and 14, the elongated body 12 is a single unit of uniform length and has a generally cylindrical outer wall 39 formed with a set of rearward external threads 40 and a set of forward external threads 42. Body 12 is provided with an interior throughbore formed by four differently sized and differently spaced, longitudinal grooves 44, 46, 48, 50 for containing the batteries 14, 16, 18, 20. The grooves 44, 46, 48, 50 provide a side-by-side arrangement so that the longitudinal axes of the batteries, 14, 16, 18, 20 are parallel to each other when they are stored within the body 12. From an end view in FIGS. 3 and 4, the grooves 44, 46, 48, 50 form an asymmetrical, clover leaf design. It should be understood that each of the grooves, 44, 46, 48, 50 has a different peripheral size or curvature for holding a certain size of battery. For example, groove 44 holds battery 14 which is of the well known AAA size, groove 46 holds battery 16 which of the C size, groove 48 holds battery 18 which is of the D size and groove 50 holds battery 20 which is of the AA size. As best seen in FIGS. 5 and 6, the grooves 44, 46, 48, 50 have a common length equal to the length of the body 12 which is long enough to accommodate the longest length battery, in this case, the D size battery 18, and the progressively shorter AA size battery 20, the C size battery 16 and the AAA size battery 14, respectively. The batteries 14, 16, 18, 20 have respective positive poles 14a, 16a, 18a, 20a and respective negative poles 14b, 16b, 18b, 20b, the latter arranged to be coplanar at the rear of the body 12 and engageable against a front surface of the compressable washer 28. While each of the batteries 14, 16, 18, 20 is physically distinctive in size, it is noted that electrically each battery is rated at 1.5 volts.

As seen in FIGS. 4, 5, 6 and 12, reflector head 22 has a rounded configuration with an outer wall 52 which extends generally beyond the diameter of end cap 24. A front portion of the reflector head 22 is provided with a parabolic reflecting surface 54 which reflects light from lamp 30 along axis 34 and out the lens 32 retained in the front edge of the head 22. The reflecting surface 54 has a hole 56 in communication with a void 58 formed in a back portion of the reflector head 22. A collar 60 extending radially outwardly from the center of lamp 30 is engaged against a wall 61 of the void 58 so that a bulb portion 30a of the lamp 30 will project through the hole 56 beyond reflecting surface 54, and a contact portion 30b will extend rearwardly in the void 58 into engagement with multi-planar contact 36. In the preferred embodiment, the lamp 30 is an incandescent 1.5 volt bulb, but it should be understood that the term lamp broadly encompasses diodes, fluorescent devices and other newer lamps such as those that are zenon or krypton-filled. The back portion of the reflector head 22 is also recessed and formed with an inner wall 62 and internal threads 63 which screwthreadedly cooperate with forward external threads 42 on body 12.

Referring to FIGS. 4, 5, 6, 8 and 12, multi-planar contact 36 enables the positive poles 14a, 16a, 18a, 20a of the batteries 14, 16, 18, 20 to be in electrical contact with the lamp 30. The multi-planar contact 36 includes a lamp-engaging contact face 64, a contact extension 66 which is coplanar with the contact face 64, and three spaced apart, L-shaped contact legs 68, 70, 72 of varying length which project from the contact face 64. Contact extension 66 is engaged with the positive pole 18a of D size battery 18. Leg 68 has face 74 engaged with positive pole 14a of the AAA size battery 14. Leg 70 has face 76 engaged with positive pole 16a of C size battery 16. Leg 72 has face 78 engaged with positive pole 20a of AA size battery 20. When reflector head 22 is screwed tightly onto the body 12, the contact face 64 and contact extension 66 are engaged against the inner wall 62 of reflector head 22 as the contact portion 30b of the lamp 30 engages a central portion of the contact face 64. At the same time, contact extension 66 is in contact with positive pole 18a of the D size battery 18, and the faces 74, 76, 78 are in contact with the positive poles 14a, 16a, 20a of the respective batteries 14, 16, 18. The rigid, multi-planar contact 36 is a key component of the flashlight 10 because it compensates for the varying lengths of the differently sized batteries 14, 16, 18, 20 without requiring a separate adapter arrangement.

Figure 9:
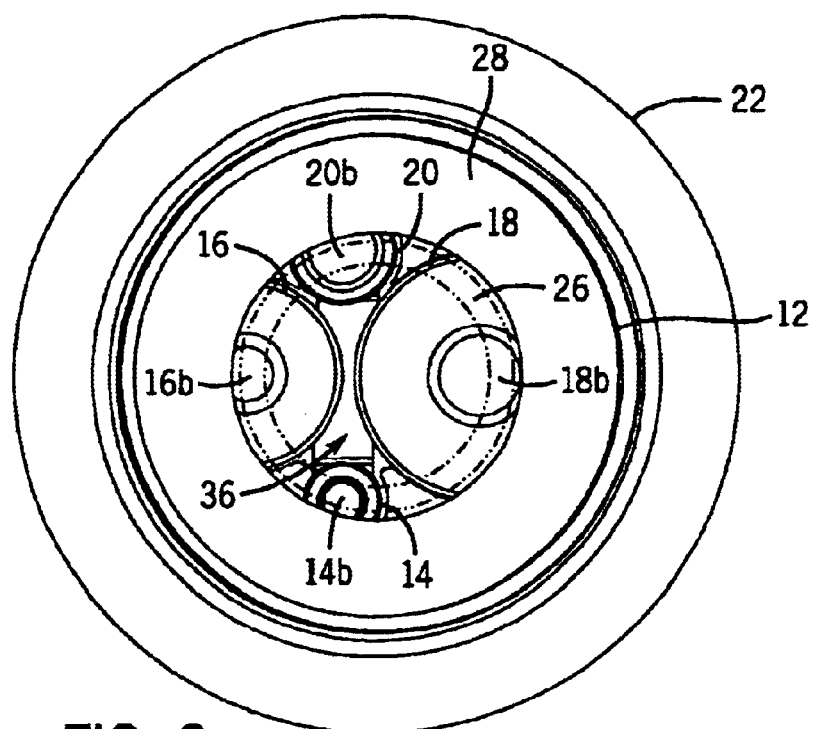
FIG. 9 is a rear end view of the flashlight of FIG. 2 with the end cap removed.
Figure 14:
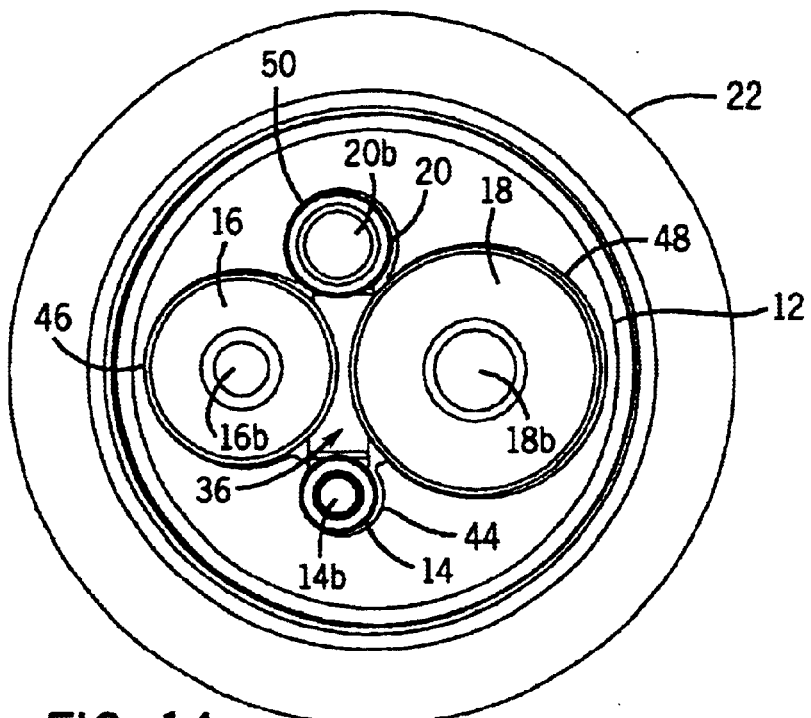
FIG. 14 is a rear end view of the flashlight of FIG. 13 with the end cap removed and the compressable washer removed.
Figure 10:
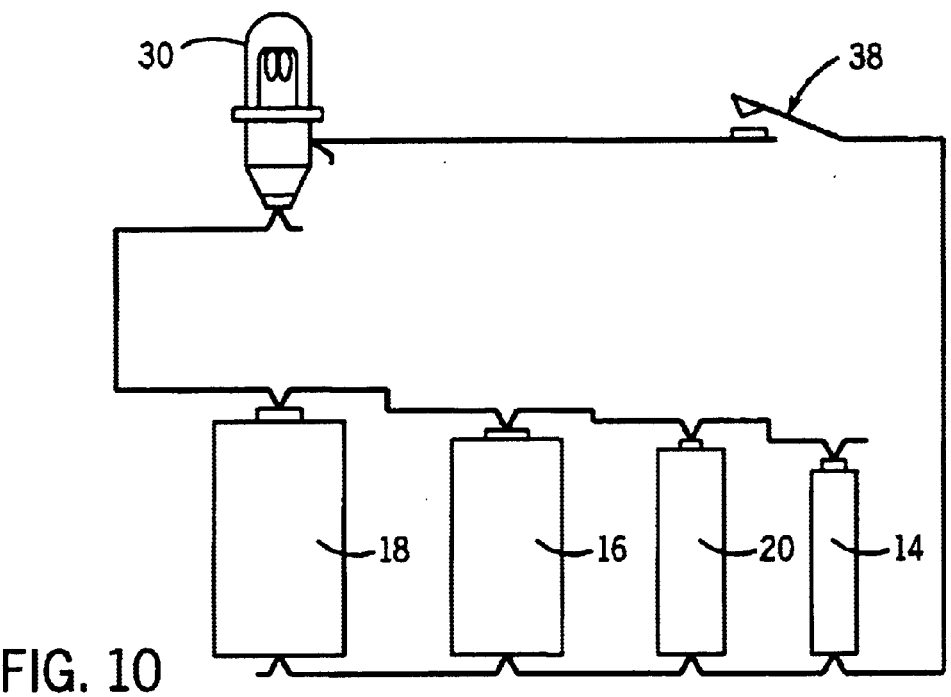
FIG. 10 is a circuit representation for the flashlight in FIG. 1.

End cap 24 is cylindrical in shape and has a C-shaped cross section with a planar rear wall 80 and a knurled, cylindrical side wall 82. The planar rear wall 80 has an inside surface which is integrally formed with the contact ring 26. The side wall 82 is formed with internal threads 84 which are screwthreadedly cooperable with the rearward external threads 40 on body 12. Compressable washer 28 is interposed between the rear of body 12 and the rear wall 80 of end cap 24. As seen in FIGS. 5 and 6, the contact ring 26 has a smaller diameter then central hole 86 in compressable washer 28 so that the contact ring 26 can be selectively moved out of and into engagement with the negative poles 14b, 16b, 18b, 20b of batteries 14, 16, 18, 20 by screwing the end cap 24 clockwise or counterclockwise. FIG. 6 shows the contact ring 26 out of engagement with the negative poles 14b, 16b, 18b, 20b of the batteries 14, 16, 18, 20 and corresponds to an off position. FIGS. 5 and 9 show the contact ring 26 moved into engagement with the negative poles 14b, 16b, 18b, 20b as the washer 28 is slightly compressed, and corresponds to an on position. The end cap 24 thus functions as switch 38 in the circuit diagram of FIG. 10 with the rotation of the end cap 24 defining the on and off positions.

In the preferred embodiment, the body 12, the reflector head 22, the end cap 24 including contact ring 26 and the multi-planar contact 36 are all constructed of electrically conductive metal. Body 12 is preferably designed to accommodate the combination of an AAA size battery 14, a C size battery 16, a D size battery 18 and an AA size batter 20 in a side-by-side, parallel array such as depicted in FIGS. 5, 6, 13 and 14. When the end cap 24 is turned counterclockwise to disengage contact ring 26 from the negative poles 14b, 16b, 18b, 20b of batteries 14, 16, 18, 20, the flashlight 10 is in the off position as represented by the open switch 38 in the circuit representation of FIG. 10. When the end cap 24 is turned clockwise to move the contact ring 26 into engagement with the negative poles 14b, 16b, 118b, 20b of batteries 14, 16, 18, 20, a closed electrical circuit is completed through the end cap 24, body 12 and reflector head 22 to the multi-planar contact 36 so that switch 38 is effectively closed and lamp is energized to provide illumination.

It should be fully understood, however, that the flashlight 10 is also operative by using a single battery, in this example, the D size battery 18 (FIG. 12) or any combination of the batteries 14, 16, 18, 20. As long as the battery 14, 16, 18, 20 has a voltage which is at least as great as the voltage of the lamp 30, the flashlight 10 is operable due to the parallel placement of the batteries 14, 16, 18, 20 in the electrical circuit. This means that operability of the flashlight 10 is ensured as long as a single working battery of a popular AAA, C, D or AA size is available.

Figure 7:
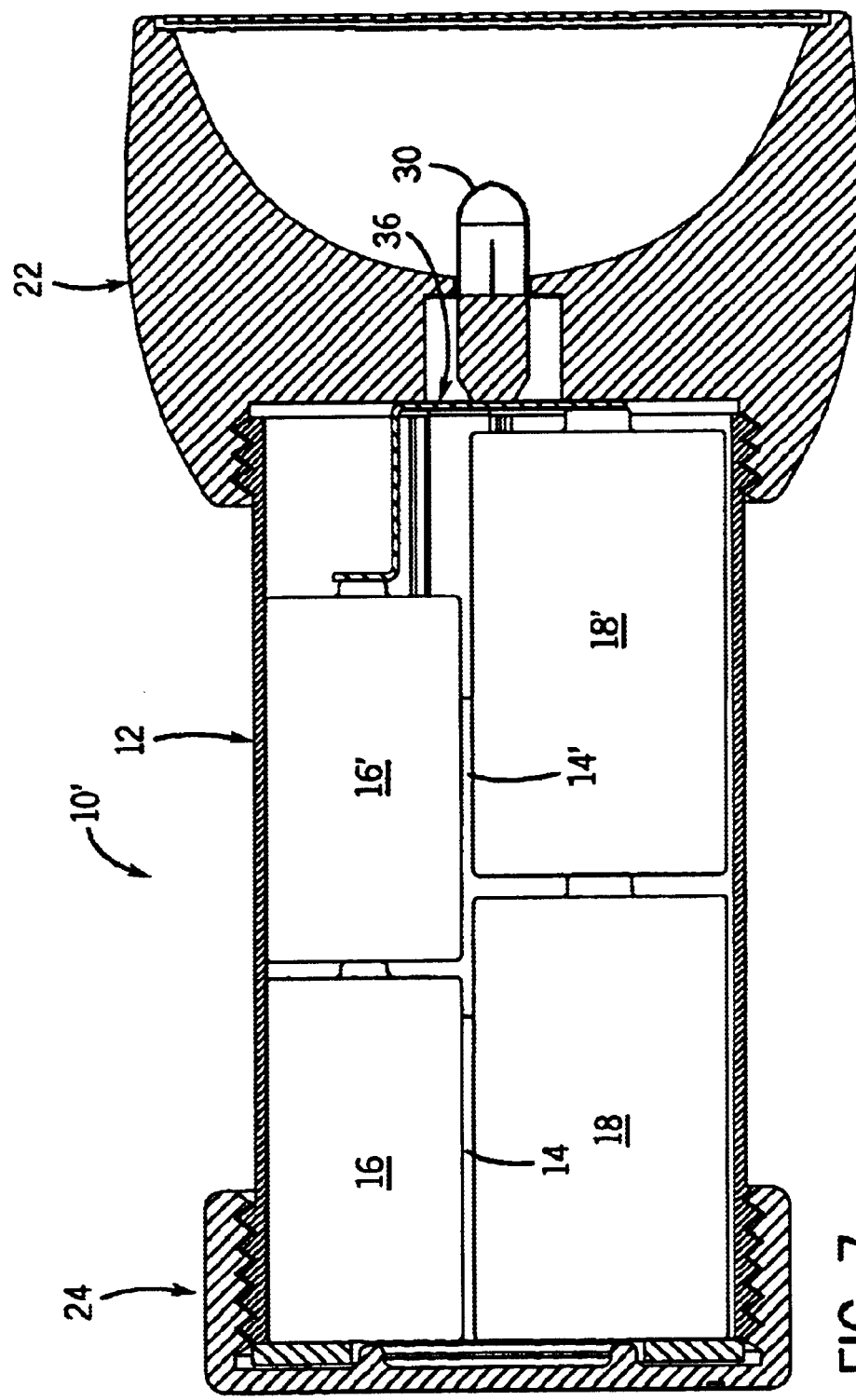
FIG. 7 is a sectional view like FIG. 6 showing an alternative embodiment of the invention.
Figure 11:
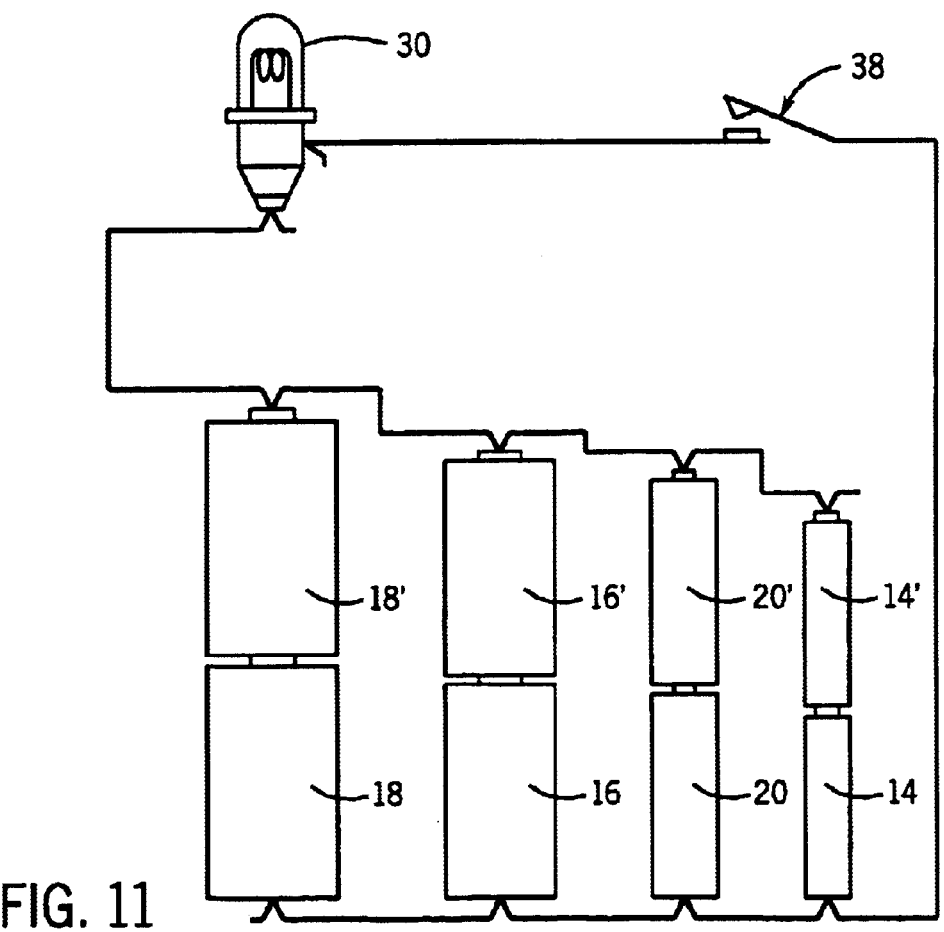
FIG. 11 is a circuit representation for the flashlight in FIG. 7.
Figure 12:
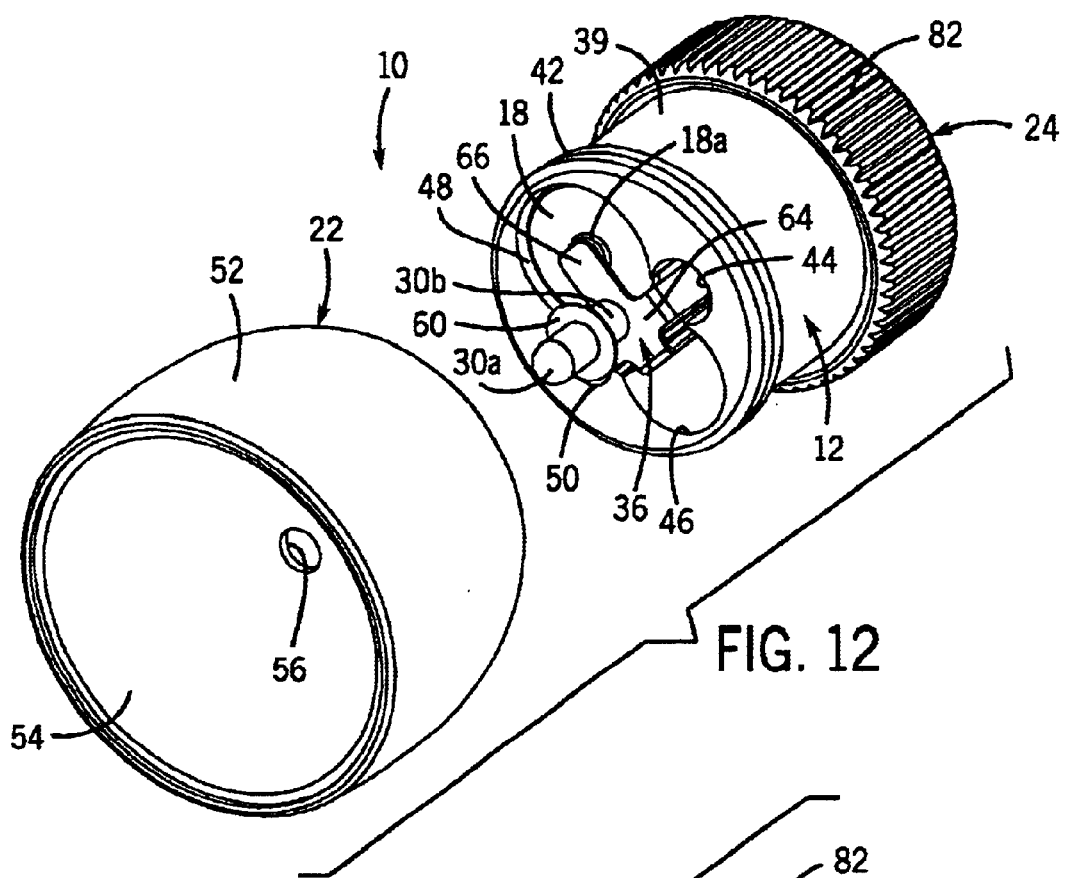
FIG. 12 is a partially exploded, front perspective view of the flashlight in FIG. 1 showing the use of a single battery.
Figure 13:
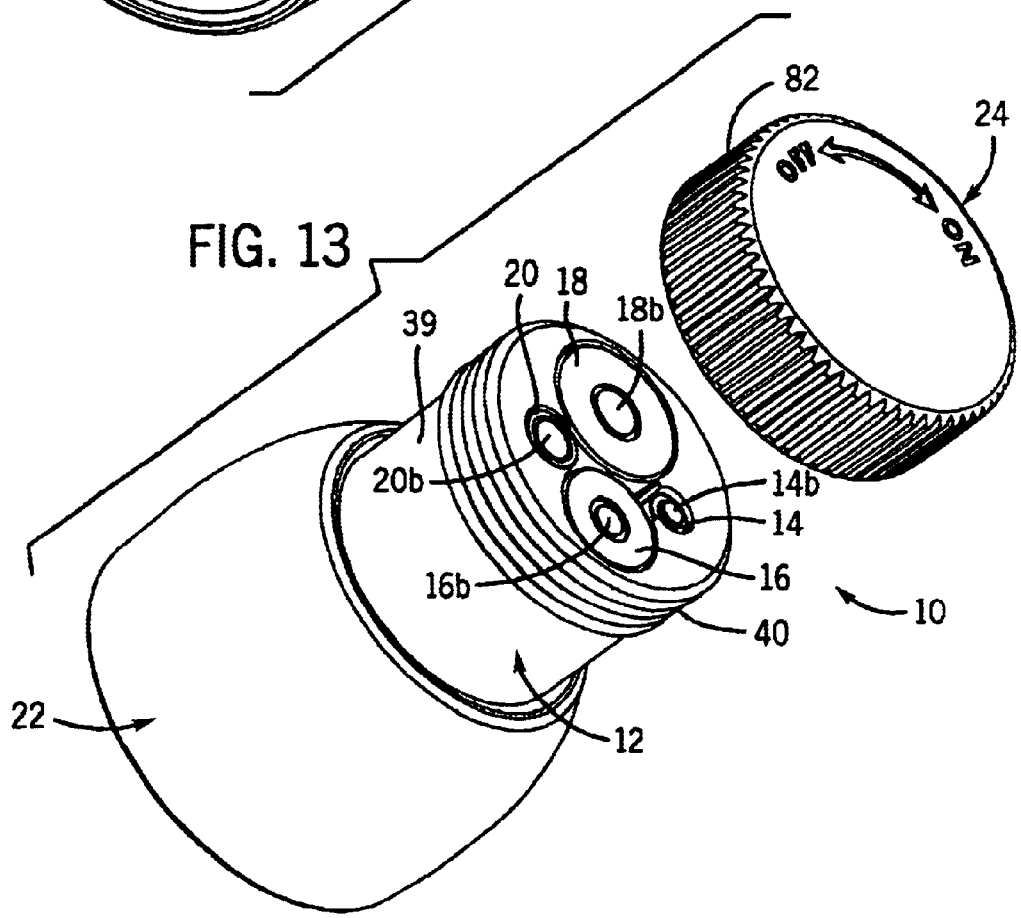
FIG. 13 is a partially exploded, rear perspective view of the flashlight in FIG. 2 showing the use of four differently sized batteries.

Whereas the preferred embodiment sets forth a 1.5 volt, single stack design, the present invention also contemplates an alternative embodiment shown in FIGS. 7 and 11 for a 3 volt design which employs a double stack of batteries 14, 14', 16, 16', 18, 18', 20, 20'. With the exception that the length of body 12 is doubled and that at least one double stack of batteries is necessary, the structure and operation of the flashlight 10' in FIG. 7 is essentially identical to that described above.

The present invention thus provides a simple and economic flashlight of relatively few components which is operable with differently and popularly sized batteries of the AAA, C, D and AA sizes and which may be operable with a single one or combination of such batteries. The particular design of this flashlight makes it extremely convenient and efficient for a user to employ a good battery which might normally sit unused in a junk drawer, a tool box, a backpack or the like.

In the flashlight described above, it should be understood that construction and material selections will occur to those skilled in the art. For example, the interior of the body 12 may be provided with different types and numbers of grooves to accommodate different shapes of batteries. In fact, the interior or exterior of body 12 can be designed in other ways to accommodate at least two differently sized batteries in a side-by-side arrangement. It is further noted that the body 12, reflector head 22 and end cap 24 can be manufactured from plastic with appropriate modifications made to enable the completion of the electrical circuit to power the lamp 30. The multi-planar contact 36 can be modified with the desired number of contacts depending on the number and size of batteries used.

While the invention has been described with reference to a preferred embodiment, those skilled in the art will appreciate that certain substitutions, alterations and omissions may be made without departing from the spirit thereof. For example, it should be appreciated that the positive poles 14a, 16a, 18a, 20a of the batteries 14, 16, 18, 20 could be coplanar and the negative poles 14b, 16b, 18b, 20b could be variously located axially in the body 12. Also, it should be understood that the components of the flashlight 10 could be made of other materials, such as non-conductive plastic, and that the switch 38 formed by end cap 24 could be replaced by different designs. Accordingly, the foregoing description is meant to be exemplary only, and should not be deemed limitative on the scope of the invention set forth in the following claims.

I claim:

1. A flashlight for differently sized batteries, each having a different length, a different cross sectional area, a positive pole and a negative pole, the flashlight comprising:

a single elongated body having a plurality of differently sized retaining structures for holding differently sized batteries in side-by-side relationship, each retaining structure being formed to receive only one size of at least one battery;

an end cap attached to one end of the body and provided with a first contact therein commonly engageable with the negative poles of the battery;

a reflector head attached to the opposite end of the body and holding a lamp; and a second contact commonly and directly engaged against the positive poles of the batteries, the reflector head and the lamp, the flashlight being constructed and arranged to connect the batteries electrically in parallel with one another.

2. The flashlight of claim 1, wherein the body holds the battery such that the negative poles are coplanar in the body, and the positive poles are variously located axially in the body.

3. The flashlight of claim 2, wherein the second contact includes a plurality of faces for engaging the positive poles variously located axially in the body.

4. The flashlight of claim 1, wherein the body is formed with a uniform length.

5. The flashlight of claim 1, wherein one set of the positive poles and the negative poles is coplanar in the body and the other set of positive poles and negative poles is variously located axially in the body.

6. A flashlight for differently sized batteries, each having a different length, a different cross sectional area, a positive pole and a negative pole, the flashlight comprising:
   an elongated body having a plurality of differently spaced and differently sized longitudinal grooves, each groove being configured to retain one of the differently sized batteries so that the batteries lie parallel to each other with the negative poles of the batteries being coplanar, and the positive poles of the batteries being variously located in different planes axially in the body;
   an end cap screwthreadedly attached to a rear portion of the body, the end cap being formed with a contact ring selectively engageable and disengageable with the coplanar negative poles of the batteries;
   a reflector head screwthreadedly attached to a forward portion of the body for holding a lamp therein; and
   a multi-planar contact interposed between the positive poles of the batteries and the reflector head, and engaged against the lamp, the multi-planar contact having a number of faces disposed in the different planes for constantly engaging the positive poles of the batteries.

7. The flashlight of claim 6, wherein rotation of the end cap acts as a switch for selectively placing the lamp in electrical communication with the batteries.

8. The flashlight of claim 6, wherein the body, the end cap with the contact ring, the reflector head, the multi-planar contact and the batteries define an electrical circuit connecting the batteries electrically in parallel with one another.

9. The flashlight of claim 6, wherein the body contains at least one battery.

10. The flashlight of claim 9, wherein the battery is selected from the group consisting of AAA, C, D and AA size batteries.

11. The flashlight of claim 9, wherein the battery has a circular cross sectional area.

12. The flashlight of claim 6, wherein the body has four differently spaced grooves with different curvatures for holding cylindrically shaped, differently sized batteries.

13. The flashlight of claim 6, wherein the body contains at least two batteries of the same size in end-to-end relationship.

14. The flashlight of claim 6, wherein the multi-planar contact compensates for the varying lengths of the differently sized batteries.

15. The flashlight of claim 6, wherein the body, the end cap with the contact ring, the reflector head, and the multi-planar contact are all constructed of an electrically conductive, metallic material.

16. The flashlight of claim 12, wherein a first groove is capable of holding at least one AAA size battery, a second groove is capable of holding at least one AA size battery, a third groove is capable of holding at least one C size battery, and a fourth groove is capable of holding at least one D size battery.

17. In a flashlight having a body for holding differently sized batteries, each having a different length, a different cross sectional area, a positive pole, and a negative pole, an end cap attached to one end of the body, a reflector head with a lamp attached to an opposite end of the body, and contact structure engaged with the positive and negative poles of the batteries, the improvement wherein:
   the body is a single unit provided with a plurality of differently spaced and differently sized retaining structures for holding the differently sized batteries in parallel relationship within the same body, each retaining structure being formed to receive only one size of battery, and
   the contact structure includes a rigid, multi-planar contact compensating for the varying lengths of the differently sized batteries within the same body.

* * * * *